K. GAULDIE.
HYDRAULIC MEANS FOR COMPRESSING GASES.
APPLICATION FILED MAY 1, 1915.
1,237,196.
Patented Aug. 14, 1917.
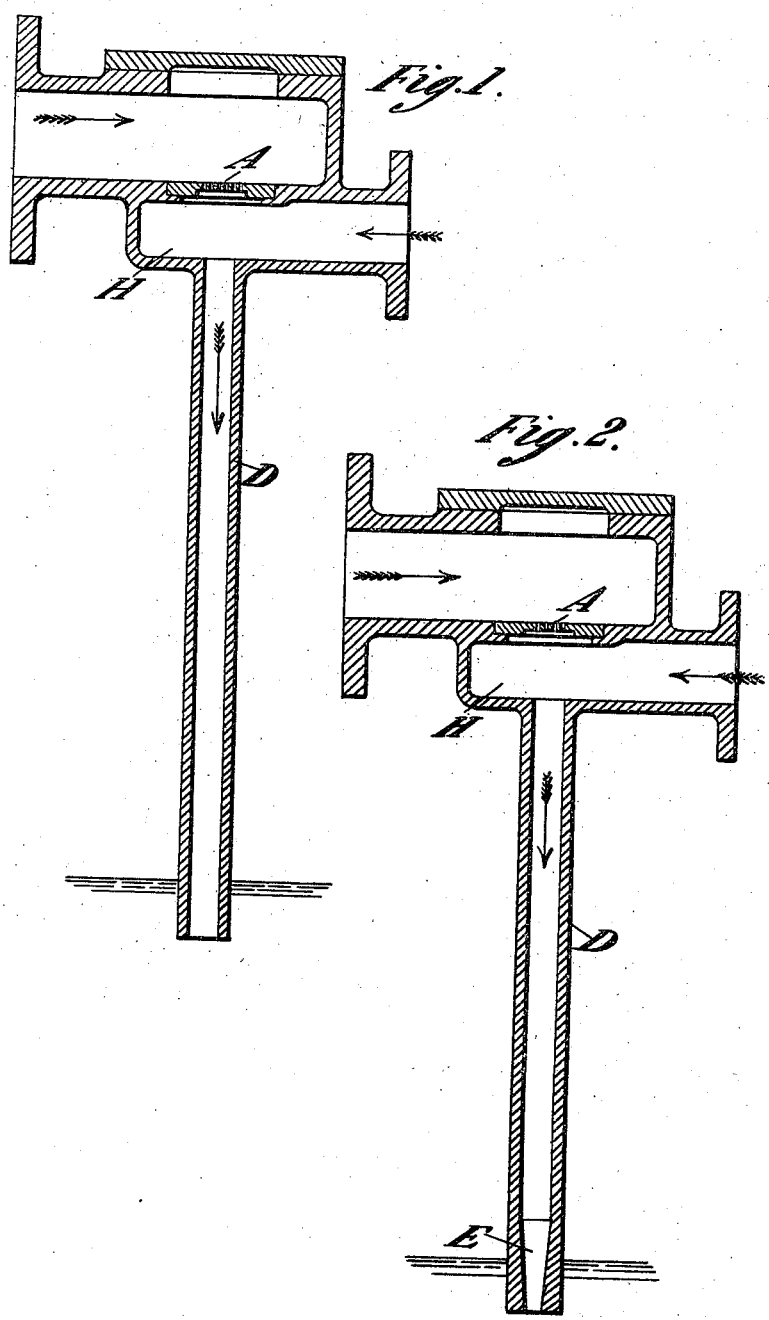
Witnesses
Inventor
Kenneth Gauldie,
by
Attorney.

UNITED STATES PATENT OFFICE.

KENNETH GAULDIE, OF GLASGOW, SCOTLAND.

HYDRAULIC MEANS FOR COMPRESSING GASES.

1,237,196.

Specification of Letters Patent.

Patented Aug. 14, 1917.

Application filed May 1, 1915. Serial No. 25,323.

*To all whom it may concern:*

Be it known that I, KENNETH GAULDIE, a subject of the King of Great Britain, residing in Glasgow, Scotland, have invented certain new and useful Improvements in Hydraulic Means for Compressing Gases, of which the following is a specification.

This invention relates to hydraulic devices of the ejector type such as are used, for example, for removing the air from steam engine condensers, and in particular it relates to apparatus of this class in which the area required for the unconstrained flow of the stream or streams of the entraining liquid is not of materially increasing value in the direction of motion of the liquid.

According to the present invention, the entraining liquid is distributed over the cross section of a mixing chamber at one end of which all the gas to be compressed enters, the said chamber consisting of a channel, the length of which is at least eight times its mean diameter and the cross sectional area of which does not increase in the direction of flow, and may be even smaller at the discharge end than at the inlet end. It has been found that when the ratio of the length of the mixing tube to its mean diameter is less than eight, the efficiency of the ejector is low but beyond this ratio the efficiency rapidly increases. An expanding channel may be added at the discharge end of the mixing chamber, but when the entraining water passes through the air space at a high velocity sufficient for self-ejection without the use of an expanding channel there is no advantage gained by this expedient which would, therefore, usually be omitted.

In most ejectors the rise in pressure taking place in the ejection channel is due partly to a quick rise of pressure resulting from the shock caused by the sudden change in velocity of the water in the region where it coalesces with its entrained air into a more or less homogeneous emulsion capable of exerting a static pressure against the walls of the ejection passage, and partly to the rise in pressure taking place in the expanding channel after the shock has taken place. In those modifications of the invention in which no expanding passage is used, the whole rise in pressure takes place at the shock zone.

In the accompanying drawings, Figure 1 is a longitudinal section of a hydraulic ejector embodying the principle of the invention, Fig. 2 being a similar view of a slightly modified construction.

As therein shown, parallel jets of water from a nest of nozzles A are directed through the air space H and down the long parallel mixing tube D, the discharge end of which is submerged in liquid. It is practically impossible to insure absolute parallelism of a large number of jets and consequently some of the water is caught on the walls of the tube where much of the energy is dissipated. The position of the shock zone depends partly on these friction losses and is in consequence not absolutely determinate, but as far as possible it should be close to the discharge end of the tube D, and when an expanding extension to this tube is provided, the expansion should preferably be arranged to begin just below the point at which the shock takes place.

It may, in certain circumstances, be an advantage that the mixing tube should have longitudinally parallel sides throughout a portion of its length, preferably the major portion, but have a contracting outlet part as indicated at E in Fig. 2.

Instead of subdividing the entraining water into jets as above described, any other method of subdivision may be adopted which does not cause the water to spread over an increasing area in its forward movement. For example, the water may be subdivided in the known manner by impinging jets which produce one or more fan-shaped sheets of water or spray. In this case the mixing passage should conform in cross section with the shape of such sheet or sheets while maintaining an approximately constant area, *i. e.*, it should contract in one plane while expanding in the other.

The invention has been described with particular reference to air pumps for compressing air from condenser pressure to atmospheric pressure, but with suitable modifications it is equally applicable to compressing gases between any pressure limits. When the higher pressure differs from atmospheric pressure the sealing tank into which the ejector discharges its mixture of air and water must be in a closed vessel.

Having thus described my invention and the best means I know of carrying the same into practical effect, I claim:—

1. A hydraulic device for ejecting and compressing gases comprising a mixing chamber consisting of a tube the cross section of which does not increase in the direction of motion of the liquid, the length of the tube being at least eight times its mean diameter, compartments at the upper end of the tube by which the entraining water and the whole of the entrained gases enter the tube and means by which the jets of entraining water move in directions substantially parallel to the walls of the tube.

2. A hydraulic device for ejecting and compressing gases, comprising a mixing chamber consisting of a tube the cross section of which does not increase in the direction of motion of the liquid, the length of the tube being at least eight times its mean diameter, compartments at the upper end of the tube by which the entraining water and the whole of the entrained gases enter the tube and a nest of nozzles from which the entraining jets are distributed over the cross-section of the mixing tube and move in directions substantially parallel to the walls of the tube.

3. A hydraulic device for ejecting and compressing gases, comprising a mixing chamber consisting of a tube the cross-section of which does not increase in the direction of motion of the liquid, the length of the tube being at least eight times its mean diameter, compartments at the upper end of the tube by which the entraining water and the whole of the entrained gases enter the tube, and means by which the entraining water coalesces with the entrained air at points adjacent to the discharge end of the tube.

4. A hydraulic device for ejecting and compressing gases, comprising a mixing chamber consisting of a tube the greater portion of which is of constant cross-section but the final portion of which is of decreasing area, the length of the tube being at least eight times its mean diameter, compartments at the upper end of the tube by which the entraining water and the whole of the entrained gases enter the tube and means by which the jets of entraining water move in directions substantially parallel to the walls of the tube.

In testimony whereof I have signed my name to this specification in the presence of two subscribing witnesses.

KENNETH GAULDIE.

Witnesses:
 THOS. HALL,
 G. F. BRODIE.